US012492585B2

(12) United States Patent
Williams et al.

(10) Patent No.: US 12,492,585 B2
(45) Date of Patent: Dec. 9, 2025

(54) DETENT POSITION HINGE FOR USE WITH CONTAINMENT SYSTEMS

(71) Applicant: FLOW SCIENCES, INC., Leland, NC (US)

(72) Inventors: Scott Williams, Wilmington, NC (US); Allan James Goodman, Lake Waccamaw, NC (US)

(73) Assignee: Flow Sciences, Inc., Leland, NC (US)

( * ) Notice: Subject to any disclaimer, the term of this patent is extended or adjusted under 35 U.S.C. 154(b) by 0 days.

(21) Appl. No.: 18/456,779

(22) Filed: Aug. 28, 2023

(65) Prior Publication Data

US 2025/0075548 A1 Mar. 6, 2025

(51) Int. Cl.
*E05D 11/10* (2006.01)

(52) U.S. Cl.
CPC ....... *E05D 11/1064* (2013.01); *E05Y 2999/00* (2024.05)

(58) Field of Classification Search
CPC ............. E05D 11/1064; E05D 11/1007; E05D 11/1028; E05D 11/1035; E05D 11/1042; E05D 11/1078; E05Y 2999/00; E05Y 2201/244
See application file for complete search history.

(56) References Cited

U.S. PATENT DOCUMENTS 126,647 A * 5/1872 Otis .................... E05D 11/1014 297/145
1,166,702 A * 1/1916 Mardon et al. ..... E05D 11/1078 16/329
1,534,758 A * 4/1925 Bartholomew ..... E05D 11/1007 16/324
2,843,873 A * 7/1958 Slower .................... E05D 11/06 16/331
3,744,085 A * 7/1973 Griego ................ E05D 11/1007 16/386
5,168,601 A * 12/1992 Liu ........................... B62B 9/20 16/329
5,317,785 A * 6/1994 Kobayashi .......... H04M 1/0216 16/322
5,769,261 A * 6/1998 Gaffney .................... E05D 1/06 220/212.5
5,887,317 A * 3/1999 Baker ................. E05D 11/1007 16/329
(Continued)

FOREIGN PATENT DOCUMENTS

KR 100190849 B1 * 6/1999 ........... G06F 1/1679

*Primary Examiner* — Jason W San
*Assistant Examiner* — Matthew J Sullivan
(74) *Attorney, Agent, or Firm* — Dilworth & Barrese, LLP

(57) ABSTRACT

A detent hinge firmly secures the door of a containment system in an upward position, downward position, and optionally at pre-determined positions therebetween. The hinge generally includes two hinge assemblies each including a leaf and one or two knuckles, with the knuckles of both assemblies aligned end-to-end. The two hinge assemblies are independently rotatable relative to each other but share a rotational axis. The hinge is locked and the door is substantially immovable due to a spring-activated cam that impedes rotation of the hinge assemblies relative to each other. The hinge is unlocked by depressing a plunger which repositions the cam such that the hinge assemblies can freely rotate relative to each other, and the door can be raised or lowered.

10 Claims, 10 Drawing Sheets

(56) References Cited

U.S. PATENT DOCUMENTS

| | | | | | |
|---|---|---|---|---|---|
| 6,034,867 | A * | 3/2000 | Seo | G06F 1/1679 361/679.57 |
| 6,568,032 | B1 * | 5/2003 | Ramsauer | E05D 11/1078 16/329 |
| 6,676,098 | B2 * | 1/2004 | Lin | E05D 11/1007 248/371 |
| 6,688,572 | B2 * | 2/2004 | Huang | F16M 13/02 248/291.1 |
| 7,854,041 | B2 * | 12/2010 | Olsson | H04M 1/0216 16/303 |
| 8,359,709 | B2 * | 1/2013 | Van Gennep | E05D 11/1007 16/229 |
| 8,471,145 | B2 * | 6/2013 | Suzuki | H05K 5/0226 174/67 |
| 8,584,318 | B1 * | 11/2013 | Tu | E05D 7/1016 16/262 |
| 8,656,558 | B2 * | 2/2014 | Van Gennep | E05D 11/1007 16/229 |
| 8,732,906 | B1 * | 5/2014 | Van Gennep | E05D 11/1007 16/229 |
| 9,068,382 | B1 * | 6/2015 | Hall | E05D 5/12 |
| 9,506,281 | B1 * | 11/2016 | Zaloom | E05D 11/1028 |
| 10,087,666 | B2 * | 10/2018 | Smith | F16B 39/32 |
| 11,724,377 | B2 * | 8/2023 | Marks | B25C 5/1696 227/129 |
| 11,767,694 | B2 * | 9/2023 | Naganuma | E05D 11/1078 16/221 |
| 2007/0273256 | A1 * | 11/2007 | Martin | A47B 21/06 312/223.6 |
| 2008/0169411 | A1 * | 7/2008 | Quinn | A47K 10/32 248/691 |
| 2010/0218344 | A1 * | 9/2010 | Van Gennep | E05D 11/1007 16/327 |
| 2011/0061197 | A1 * | 3/2011 | Shimomura | H04M 1/0216 16/303 |
| 2011/0094058 | A1 * | 4/2011 | Van Gennep | E05D 11/1007 16/327 |
| 2014/0259532 | A1 * | 9/2014 | Millard | E05D 11/1028 16/326 |
| 2016/0168893 | A1 * | 6/2016 | Finkelstein | E05D 11/1078 16/264 |
| 2018/0030766 | A1 * | 2/2018 | Yeom | E05D 7/086 |
| 2023/0349214 | A1 * | 11/2023 | Marsden | E05D 11/1007 |
| 2024/0068286 | A1 * | 2/2024 | Larson | E05D 11/1078 |

* cited by examiner

DETENT POSITION HINGE FOR USE WITH CONTAINMENT SYSTEMS

BACKGROUND OF THE INVENTION

The present invention relates generally to hardware, and more particularly, to a detent position hinge for use with containment systems.

Containment systems such as gloveboxes, hoods, biological safety cabinets and various hybrids are commonly used in a variety of environments such as laboratories, manufacturing facilities and industrial plants to protect the operator and/or ambient environment from materials that are being manipulated or processed. They generally include a work area and a system of fans, filters and vents that segregate and remove the unwanted fumes and/or particulates.

Many containment systems include an upwardly swinging door positioned above the work area. Typically this door is transparent to allow the operator to visualize the work area, but depending on the specific design of the isolator the door may be outside the operators field of view and/or not transparent. Doors can be used for a variety of purposes including providing access to the work area to introduce and remove materials and instruments, to create an isolated environment in the closed position, to increase airflow to the work area in the open position, and so forth. FIG. 1 depicts a known containment system 90, here a hybrid isolator that is convertible between a full open-faced vented enclosure and a vented enclosure with glove port-draft shield, including door 92 and hinge attachment region 93 above the door.

Containment system doors are held in the upward open position using a variety of compression hinges such as conventional locking hinge system 95 of FIG. 1, which includes upper mating portion 96 that releasably engages with lower mating portion 97 to retain door 92 in open position. This is not an ideal solution, with disadvantages including the tendency of the mating portions to disconnect resulting in the door suddenly and dangerously swinging downward, and because the door can only be fully open or fully closed, with no positions between. It is preferable that an operator can control the tilt of the door to optimize viewing, particularly considering height variations and personal preferences among operators. It is also desirable to control the extent to which the door is open in order to control the volume of air drawn into the system from ambient.

Another disadvantage of conventional containment system locking hinge systems is that the door is secured only in the upward position. In the downward closed position the door simply hangs there. This may be addressed by employing, for example, latch clamp 99 on FIG. 1. Unfortunately, however, this complicates the overall door system and introduces an additional locking step that an operator may or may not perform.

As can be seen, there is a need for an improved hinge for use with upwardly opening doors of containment systems. It is desirable that this hinge very firmly secures a door in the opened position and eliminates the need for additional hardware to maintain the door in the closed position. It is also desirable that the hinge is safe and easy to use, and can retain the door in predetermined positions between fully open and fully closed.

SUMMARY OF THE INVENTION

A detent hinge firmly secures the door of a containment system in an upward position, downward position, and optionally at pre-determined positions therebetween. The hinge generally includes two hinge assemblies each including a leaf and one or two knuckles, with the knuckles of both assemblies aligned end-to-end along a rod. The two hinge assemblies are independently rotatable relative to each other but share a rotational axis. The hinge is locked, meaning the door is substantially immovable, by a spring-activated cam that impedes rotation of the hinge assemblies relative to each other. The hinge is unlocked by depressing a plunger which repositions the cam such that the hinge assemblies can freely rotate relative to each other, thereby allowing the door to be moved.

BRIEF DESCRIPTION OF THE DRAWINGS

FIG. 6 depicts a side perspective view of a hinge in multiple positions, with:

FIG. 6A depicting the hinge in the locked position with an approximately 180° detent angle;

FIG. 6B depicting the hinge in the unlocked position between locked positions; and FIG. 6C depicting the hinge in the locked position with an approximately 20° detent angle;

FIG. 10 depicts the hinge in multiple positions with:

FIG. 10A depicting the hinge locked in position;

FIG. 10B depicting the hinge unlocked;

FIG. 10C depicting the center hinge assembly rotating backward;

FIG. 10D depicting the center hinge assembly continuing to rotate backward;

FIG. 10E depicting the center hinge assembly almost locked in position; and

FIG. 10F depicting the hinge locked in position.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:

10—Detent hinge;
12—Rotation axis;
20—Outside hinge assembly;
22—Outside assembly leaf;
24—First outside knuckle;
25—Cam divot;
27—Second outside knuckle;

30—Center hinge assembly;
32—Center assembly leaf;
34—Center knuckle;
35—Cam locking notch;
36—First engagement portion;
37—Second engagement portion;
40—Mounting apertures;
42—Stabilizer;
43—Mounting hardware head relief;
50—Rod;
52—Threaded plunger end;
54—Threaded cam end;
60—Plunger;
61—Abutment;
62—Resilient member;
63—Bushing;
64—Locking cam;
65—Cam threads;
67—Rod channel;
90—Containment system;
92—Door;
93—Hinge attachment region;
95—Conventional locking hinge system;
96—Upper mating portion;
97—Lower mating portion; and
99—Latch clamp.

The present invention relates generally to hardware, and more particularly, to a detent position hinge for use with containment systems.

Figure 1:
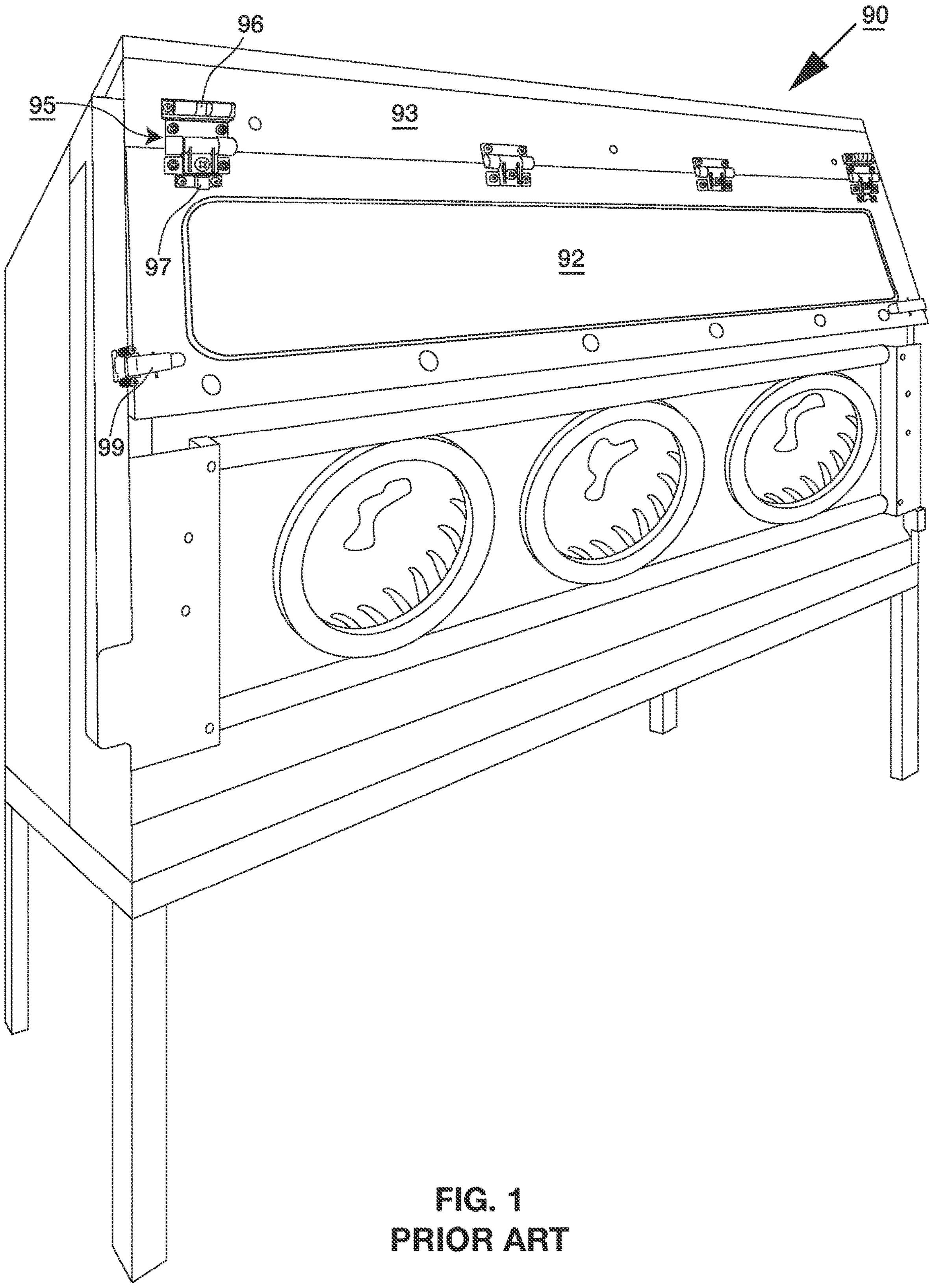
FIG. 1 PRIOR ART
FIG. 1 depicts a perspective view of a hybrid glove box containment system, with glove port draft shield installed, of the prior art.
Figure 2:
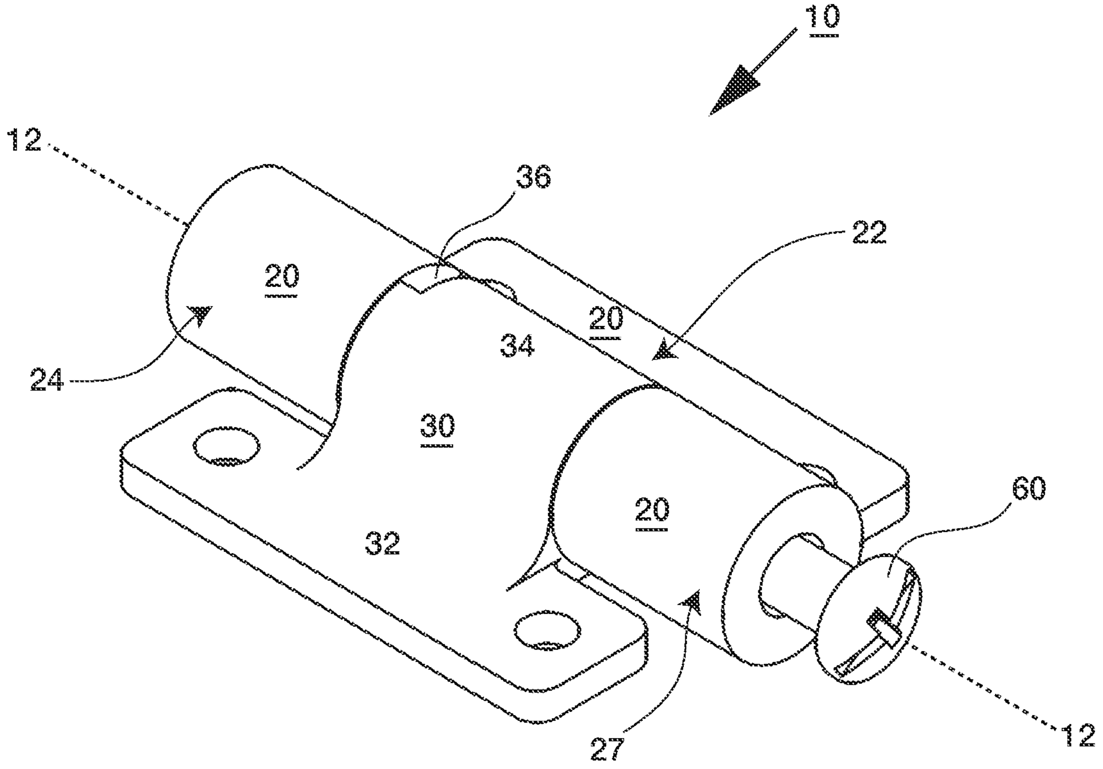
FIG. 2 depicts a top perspective view of a detent hinge of the present invention.

Referring to FIG. 2, detent hinge 10 includes outside hinge assembly 20 joined with center hinge assembly 30. When plunger 60 is depressed, hinge assemblies 20, 30 are able to rotate independently around rotation axis 12, but when plunger 60 is released the hinge assemblies will lock in place relative to each other at specific pre-determined positions.

Figure 3:
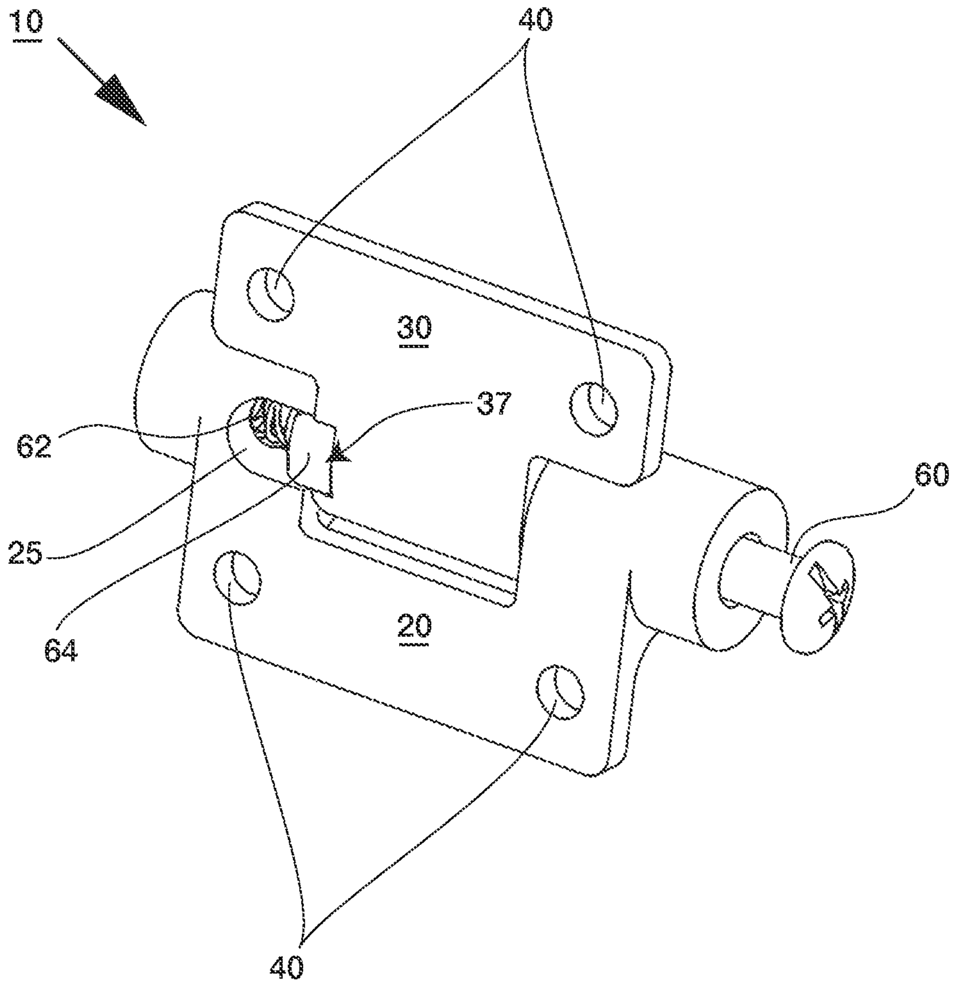
FIG. 3 depicts a bottom perspective view of a hinge of the present invention.

FIG. 3 is a bottom view of hinge 10 showing outside hinge assembly 20 joined with center hinge assembly 30. When plunger 60 is in resting non-pressed position, resilient member 62 pushes locking cam 64 inward towards the center hinge assembly. When the locking cam engages with one of the cam locking notches of the center hinge assembly, here second engagement portion 37, hinge assemblies 20, 30 are unable to rotate relative to each other and are in a "locked" position. As can be conceptualized in this view, depressing plunger 60 moves locking cam 64 out of second engagement portion 37 and into cam divot 25, and compresses resilient member 62. Upon releasing pressure on plunger 60, the resilient member will expand, pushing the cam inwards towards center hinge assembly 30. If the cam is aligned with a cam locking notch when the plunger is not depressed the cam will engage with the aligned notch and the hinge will lock.

Figure 4:
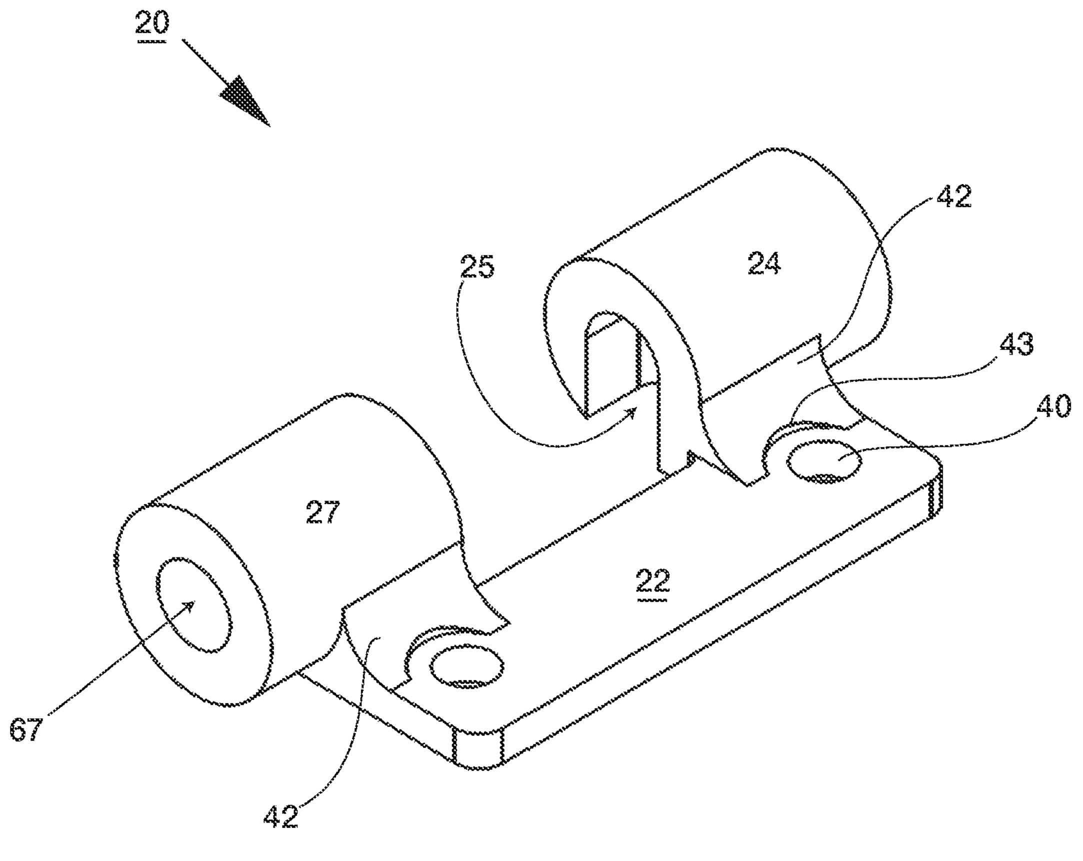
FIG. 4 depicts a top perspective view of an outside hinge assembly.

FIG. 4 depicts the top view of outside hinge assembly 20, so called because first outside knuckle 24 and second outside knuckle 27 lie outside center knuckle 34 (FIG. 2) of center hinge assembly 30. Outside hinge assembly 20 also includes outside assembly leaf 22, which defines a plurality of apertures 40. First outside knuckle 24 defines cam divot 25 which receives locking cam 64 (not shown) when plunger 60 (not shown) is depressed. When the locking cam is fully positioned within the cam divot the outside and center hinge assemblies 20, 30 freely rotate relative to each other. Stabilizers 42 strengthen the connection between outside assembly leaf 22 and knuckles 24, 27, and mounting hardware head relief 43 is a cutout to provide additional space for mounting hardware (not shown), in particular screw heads that engage with mounting apertures 40 for connecting the hinge to hinge attachment region 93. The assembly defines rod channel 67, which accepts rod 50 (not shown) for engaging other structures and providing the axis around which the hinge assemblies rotate.

Figure 5:
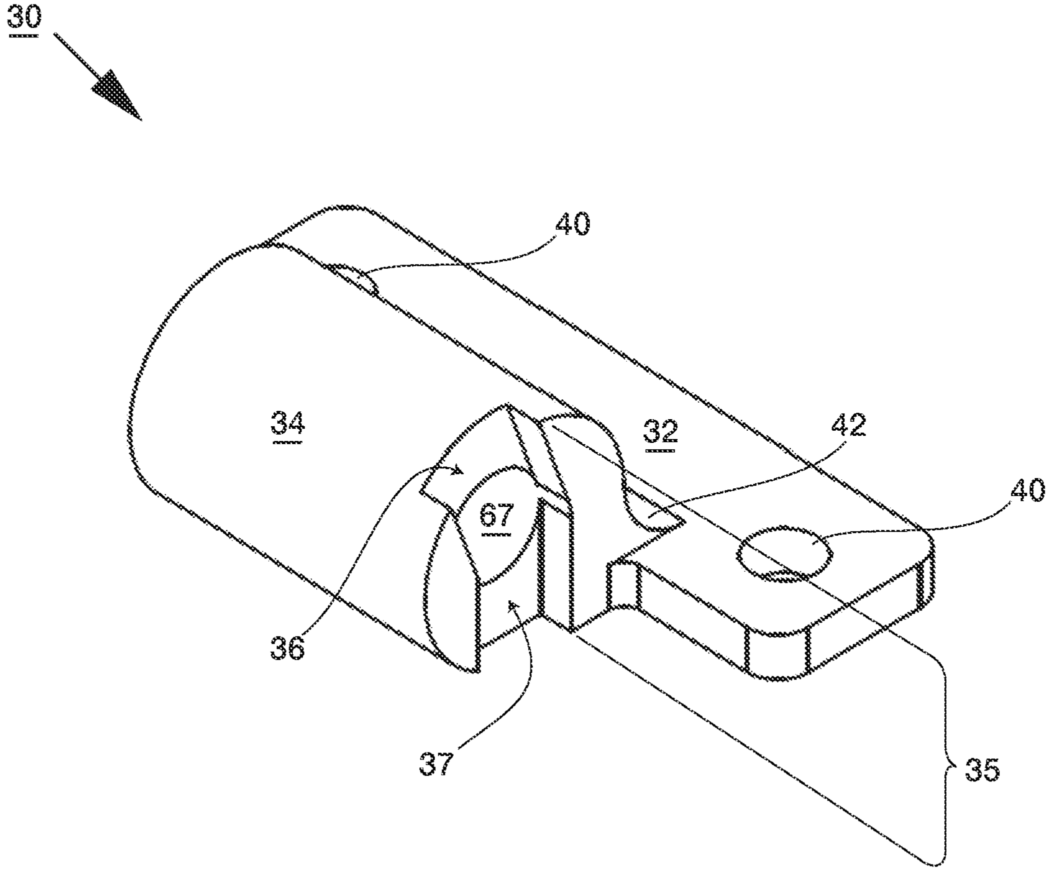
FIG. 5 depicts a top perspective view of a center hinge assembly.

FIG. 5 depicts center hinge assembly 30, so called because center knuckle 34 is between first and second outside knuckles 24, 27 (FIG. 2) when assembled. Center assembly leaf 32 defines a plurality of mounting apertures 40, and includes stabilizer 42 which is structurally and functionally analogous to the stabilizer of the outside hinge assembly. Center knuckle 34 defines cam locking notch 35 which traverses the knuckle and creates first engagement portion 36 and second engagement portion 37. The configuration depicted provides two locking positions, or detent angles, at approximately 20° and 180°, but it should be understood that it is within the scope of the invention for the cam locking notch to have a single locking position or more than two locking positions. Also, the detent angles may vary, subject to the tolerances and obstructions of design.

Figures 6, 6A, 6B, 6C:
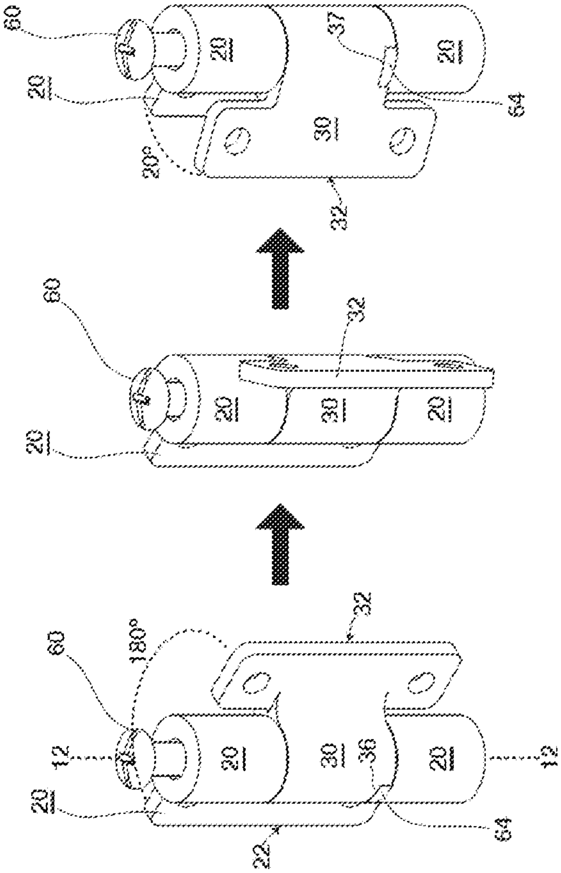

FIG. 6 depicts the hinge with outside hinge assembly 20 stationary and center hinge assembly 30 in three different positions around rotation axis 12. FIG. 6A depicts an approximately 180° detent angle, with locking cam 64 lodged in second engagement portion 37 (not visible), thereby locking leaves 22, 32 in position. In 6B, plunger 60 is depressed, thereby withdrawing locking cam 64 (not shown) into cam divot 25 (not shown) and allowing free rotation of center hinge assembly 30 relative to outside hinge assembly 20. Note that in this view first engagement portion 36 has been rotated and cannot be seen. FIG. 6C depicts an approximately 20° detent angle, with locking cam 64 lodged in first engagement portion 36 (not visible), thereby locking leaves 22, 32 in position.

Figure 7:
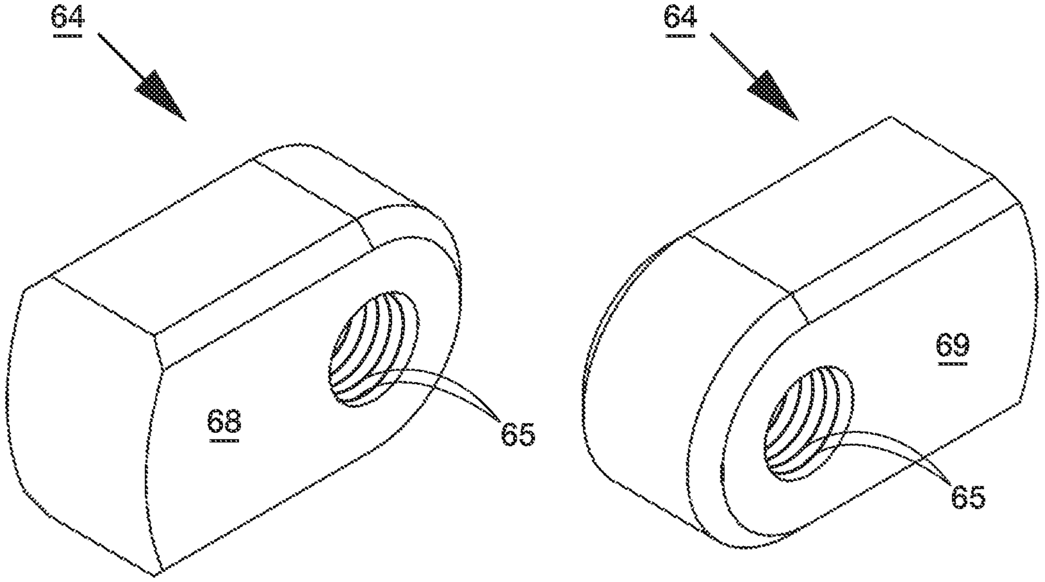
FIG. 7 depicts two perspective views of a locking cam.
Figure 8:
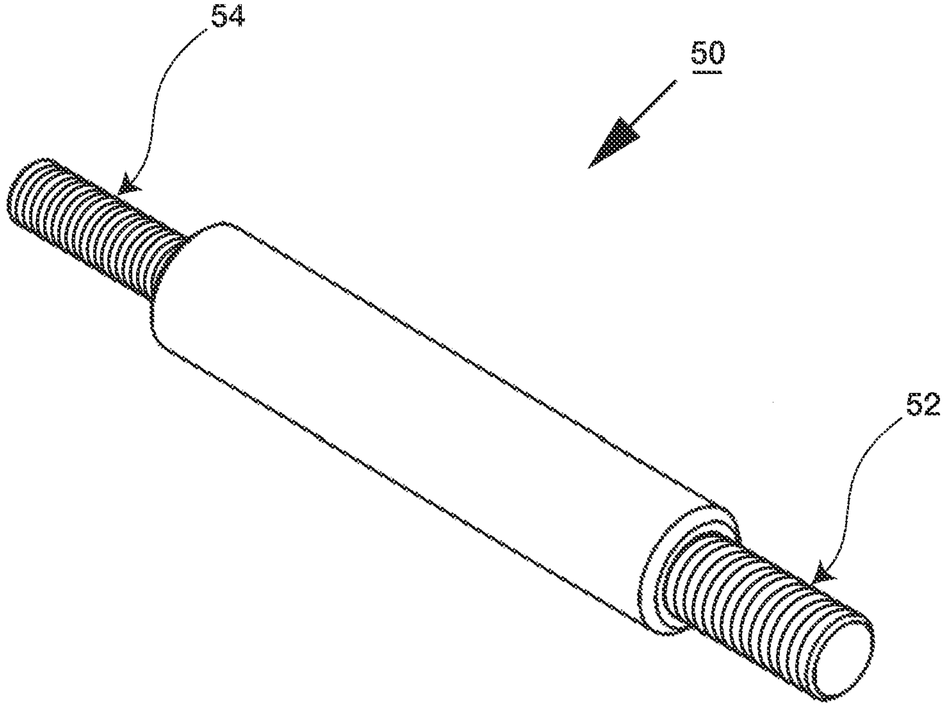
FIG. 8 depicts a side perspective view of a rod.

Referring to FIG. 7, locking cam 64 defines a plurality of cam threads 65 which engage with threaded cam end 54 of rod 50, as shown in FIG. 8. Also shown in FIG. 8 is threaded plunger end 52, which engages with plunger 60.

Figure 9:
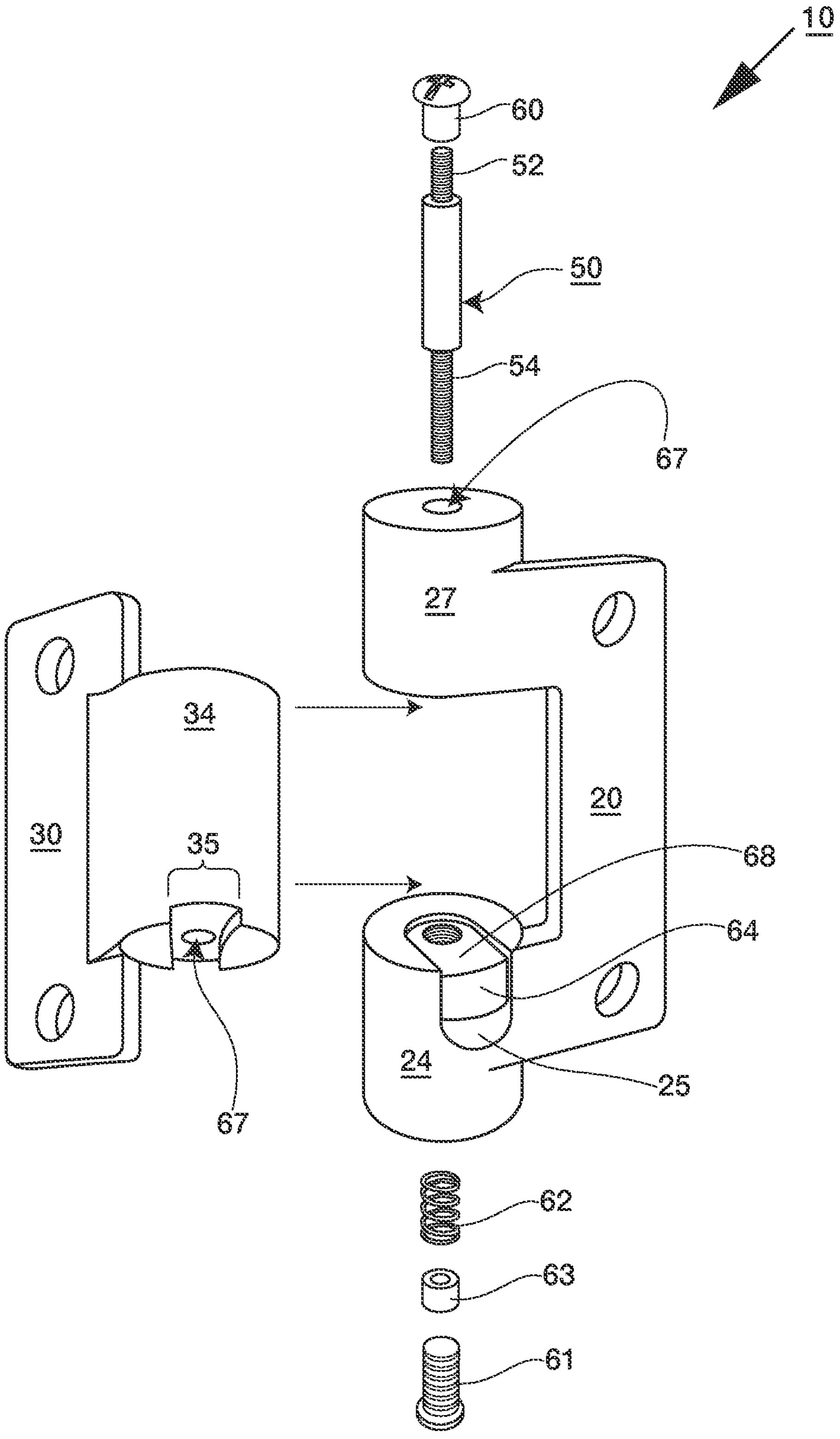
FIG. 9 depicts an exploded view of a hinge.

FIG. 9 depicts hinge 10 in exploded view. When center knuckle 34 of center hinge assembly 30 is fitted within first and second outside knuckles 24, 27 of outside hinge assembly 20, rod channels 67 are aligned and rod 50 is positioned within. Threaded plunger end 52 engages plunger 60 while threaded cam end 54 engages cam 64. Resilient member 62 exerts upward pressure on the cam such that the cam is not fully withdrawn into cam divot 25 unless plunger 60 is depressed or if cam divot 25 is not aligned with either first engagement portion 36 or second engagement portion 37. In FIG. 9 cam 64 is depicted within cam divot 25, meaning that the plunger would be depressed and the outside and center hinge assemblies 20, 30 could rotate relative to each other. Bushing 63 is preferably positioned between stationary end of resilient member 62 and abutment 61, and ensures that knuckle 24 remains concentric with all members along axis 12 without exerting additional forces on the leaf and stabilizers of hinge assembly 20. Abutment 61 is engaged with threaded end of rod channel 67 (not shown).

Figures 10, 10A, 10B, 10C, 10D, 10E, 10F:
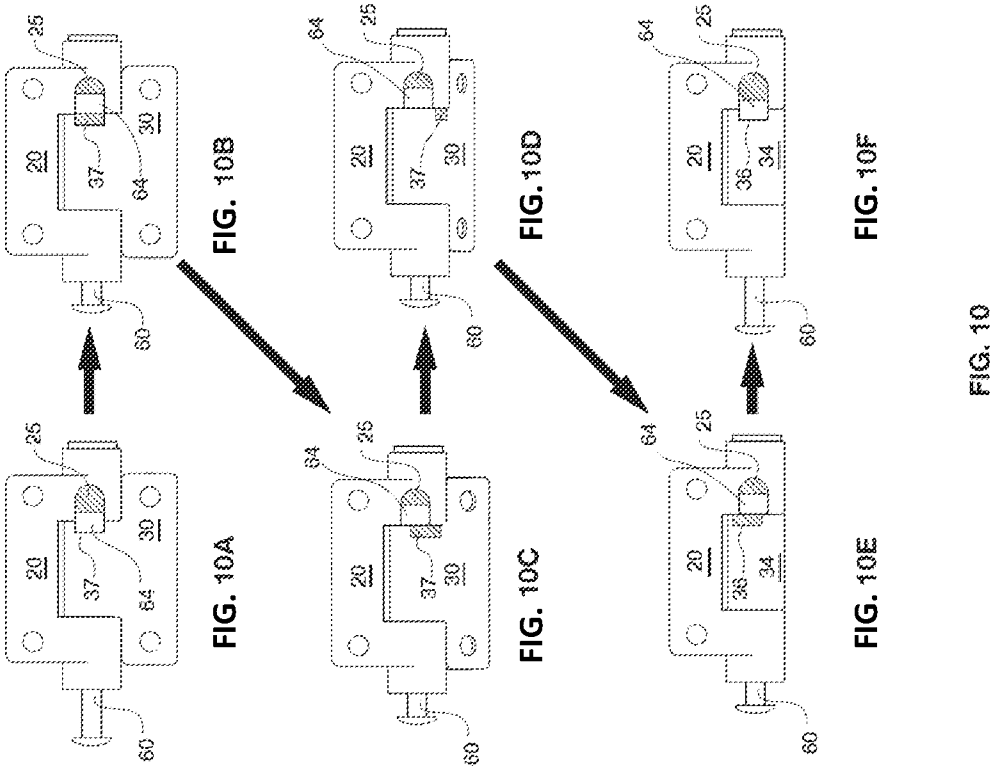

FIG. 10 depicts the hinge in multiple positions with center hinge assembly 30 rotating around stationary outside hinge assembly 20. Referring to 10A, the hinge is fully locked as evidenced by locking cam 64 within second engagement portion 37. In 10B plunger 60 is depressed and locking cam 64 has vacated second engagement portion 37 and fully entered cam divot 25, so the hinge is unlocked but not yet rotated. In 10C hinge assembly 30 is rotating backward, thereby misaligning locking cam 64 with second engagement portion 37. It is noted that in this position locking cam 64 is sliding along the edge of the center hinge assembly, and it is not necessary to maintain force on the plunger. The resilient member is maintaining pressure on the locking cam, so the locking cam will engage with cam locking notch of its own accord when locking cam and notch align. 10D depicts hinge assembly 30 continuing to rotate backward, with second engagement portion 37 almost out of visible range. In 10E first engagement portion 36 is about to align with locking cam 64. In 10F locking cam 64 is engaged with first engagement portion 36. Note that plunger 60 has returned to extended position.

In use, a detent hinge of the present invention would replace a conventional locking hinge system and a conventional latch clamp used to secure the door of a containment system in the open and closed positions, respectively. The detent hinge would be configured so that the door is held in a position fully upright and open, and fully down and closed, preferably so that the door is as flush against the containment system as possible. If desired the cam locking notch may also be configured for at least one semi-opened position. To use an operator would depress the plunger to unlock the hinge, position the door in the desired position, for example open, closed or a position therebetween, then release tension on the plunger and allow the hinge to lock, thereby securing the door in the desired position.

Certain structures and components are disclosed for purposes of describing an embodiment, and setting forth the best mode, but should not be construed as teaching the only possible embodiment. Rather, modifications may be made without departing from the spirit and scope of the invention as set forth in the following claims. Examples of modifications include a ratcheting embodiment that optionally increases the number of positions. It should be understood that all specifications, unless otherwise stated or contrary to common sense, are +/−10%, and that ranges of values set forth inherently include those values, as well as all increments between. Also, “substantially” as used herein, shall mean generally. By way of example a “substantially planar” surface includes surface imperfections but is generally planar.

What is claimed is:

1. A detent hinge including:

a. an outside hinge assembly including at least one outside knuckle defining a radially concave cam divot;

b. a center hinge assembly including at least one center knuckle, said center hinge assembly engaged with said outside hinge assembly, and said center knuckle defining an elongated first engagement portion and an elongated second engagement portion, said first and second engagement portions positioned end-to-end in a non-collinear orientation thereby defining a cam locking notch having an internal obtuse angle where said first and second engagement portions adjoin, said cam locking notch traversing one end of said center knuckle; and c. Exactly one cam, said exactly one cam positionable between said cam divot and said cam locking notch, wherein said detent hinge is in a locked position when said cam is simultaneously engaged with said cam divot and one of the said cam engagement portions of said cam locking notch.

2. The detent hinge of claim 1 wherein said detent hinge is in an unlocked position when said cam is engaged with said cam divot but not with said cam locking notch.

3. The detent hinge of claim 1 further including a plunger configured to disengage said cam from said cam locking notch.

4. The detent hinge of claim 3 wherein said plunger is configured to push said cam into said cam divot.

5. A containment system including:

a. An upwardly opening door having a horizontal rotation axis;

b. A hinge attachment region adjacent to said horizontal rotation axis; and c. At least one detent hinge connecting said door to said hinge attachment region, said detent hinge including an outside assembly leaf and a center assembly leaf, wherein said outside assembly leaf and said center assembly leaf form a first detent angle and a second detent angle therebetween, and wherein said at least one detent hinge includes an outside hinge assembly including at least one outside knuckle defining a radially concave cam divot; a center hinge assembly including at least one center knuckle engaged with said outside hinge, said center knuckle defining an elongated first engagement portion and an elongated second engagement portion, said first and second engagement portions positioned end-to-end in a non-collinear orientation thereby defining at least one cam locking notch having an internal obtuse angle where said first and second engagement portions adjoin; and exactly one cam positionable between said cam divot and said cam locking notch traversing one end of said center knuckle, wherein said detent hinge is in a locked position when said cam is simultaneously engaged with said cam divot and said cam locking notch.

6. The containment system of claim 5 wherein said at least one detent hinge includes a depressible plunger configured to allow free rotation of said door around said horizontal rotation axis.

7. The containment system of claim 5 wherein said first detent angle is approximately 20°.

8. The containment system of claim 5 wherein said second detent angle is approximately 180°.

9. The detent hinge of claim 5 wherein said detent hinge is in an unlocked position when said cam is engaged with said cam divot but not said cam locking notch.

10. A method of accessing a chamber of a containment system including the steps of:

a. Depressing a plunger of a detent hinge to push exactly one locking cam from its resting position into a radially concave cam divot;

b. Raising the free edge an upwardly opening door along a horizontal rotation axis;

c. Releasing pressure on the plunger to return the locking cam to its resting position;

d. Allowing the locking cam to engage with a cam locking notch to secure the door in an open position, wherein said cam locking notch defines a first engagement portion and a second engagement portion positioned end-to-end in a non-collinear orientation thereby defining a cam locking notch having an internal obtuse angle where said first and second engagement portions adjoin; and e. Restricting access to the chamber by depressing the plunger, lowering the free edge of the door, releasing pressure on the plunger and allowing the cam to engage with the cam locking notch to secure the door in a closed position.

* * * * *